(12) United States Patent
Liang et al.

(10) Patent No.: US 9,049,665 B2
(45) Date of Patent: Jun. 2, 2015

(54) EMO LINKAGE SIMPLIFICATION

(75) Inventors: Jeffrey Liang, Fremont, CA (US); Vinay Panchal, San Jose, CA (US)

(73) Assignee: ADVANTEST CORPORATION, Tokyo (JP)

( * ) Notice: Subject to any disclaimer, the term of this patent is extended or adjusted under 35 U.S.C. 154(b) by 639 days.

(21) Appl. No.: 13/334,612

(22) Filed: Dec. 22, 2011

(65) Prior Publication Data

US 2013/0162034 A1    Jun. 27, 2013

(51) Int. Cl.
*H04W 52/02*    (2009.01)
*H04B 1/16*    (2006.01)

(52) U.S. Cl.
CPC ......... *H04W 52/0274* (2013.01); *H04B 1/1615* (2013.01)

(58) Field of Classification Search
CPC .................................................. H04W 52/0274
USPC .................................................. 307/326, 113
See application file for complete search history.

(56) References Cited

U.S. PATENT DOCUMENTS

| | | | |
|---|---|---|---|
| 6,178,410 B1 * | 1/2001 | Kunde et al. .................. | 705/406 |
| 7,161,264 B2 * | 1/2007 | Kanekawa et al. ............ | 307/113 |
| 7,504,747 B2 * | 3/2009 | Pullmann et al. ............. | 307/117 |
| 7,847,682 B2 * | 12/2010 | Jung et al. ..................... | 340/522 |
| 8,030,803 B1 * | 10/2011 | Ford .............................. | 307/326 |
| 2001/0014003 A1 * | 8/2001 | Dible ............................ | 361/234 |
| 2006/0072265 A1 * | 4/2006 | Bucella et al. ................. | 361/90 |
| 2007/0090940 A1 * | 4/2007 | Roark et al. .................. | 340/506 |
| 2008/0067877 A1 * | 3/2008 | Nitsche ......................... | 307/328 |
| 2009/0066502 A1 * | 3/2009 | Boettcher et al. ............. | 340/532 |

* cited by examiner

*Primary Examiner* — Daniel Cavallari

(57) ABSTRACT

Disclosed herein is a simplified EMO linkage circuit that enables add-on equipment without retrofit, and eliminates the need for multi-contact EMO switches.

6 Claims, 2 Drawing Sheets

EMO LINKAGE SIMPLIFICATION

FIELD OF THE INVENTION

This invention relates to electrical circuits for system safety controls, and in particular to an emergency machine off for shutdown of equipment.

BACKGROUND

In many environments such as industrial environments, multiple pieces of equipment are utilized which may share energy or power hazards. Under these circumstances it is important for safety purposes to incorporate EMO (Emergency Off) initiated from any piece of equipment which will shut off all the equipment if a hazardous condition occurs. An example of a patented EMO feature is illustrated in US Patent Publication US 2009/0066502, published Mar. 12, 2009.

A possible straightforward design of EMO linkage utilizes N EMO switches each having N contacts, where N is the number of pieces of equipment in a test cell. An example of a test cell in a manufacturing environment might include: a puncher; a presser; a packager; and a handler. The various pieces of equipment in a test cell may cover a large physical area, but EMO connectivity must be maintained between all the pieces of equipment. FIG. 1 illustrates an example of the aforementioned EMO linkage design. In this example, four pieces of equipment 100, 105, 110, and 115 share hazard conditions. Each piece of equipment includes a 4-contact EMO switch 120. Four power loops 125, 130, 135, and 140 are connected through each EMO switch, and a local EMO control circuit 145 is included in each power loop. If the power loop is closed, the local shut-down features are not activated. However, when any one of the EMO switches 120 are depressed, contacts 150 are broken for each power loop, thereby opening all four power loops. In this case, local EMO control circuits 145 are activated, shutting down all four pieces of equipment.

A problem with this aforementioned straightforward design is the difficulty in changing the equipment configuration, e.g., adding a new piece of equipment. Each time new equipment is added, an extra link in the chain (i.e. the power loops) is added, and one more contact must be added to the EMO switches for each piece of equipment in the cell. This makes field retrofit difficult, and may require design modification.

SUMMARY OF THE INVENTION

Disclosed herein is a simplified EMO linkage circuit that enables add-on equipment without retrofit, and eliminates the need for multi-contact EMO switches.

DETAILED DESCRIPTION

Figure 1:
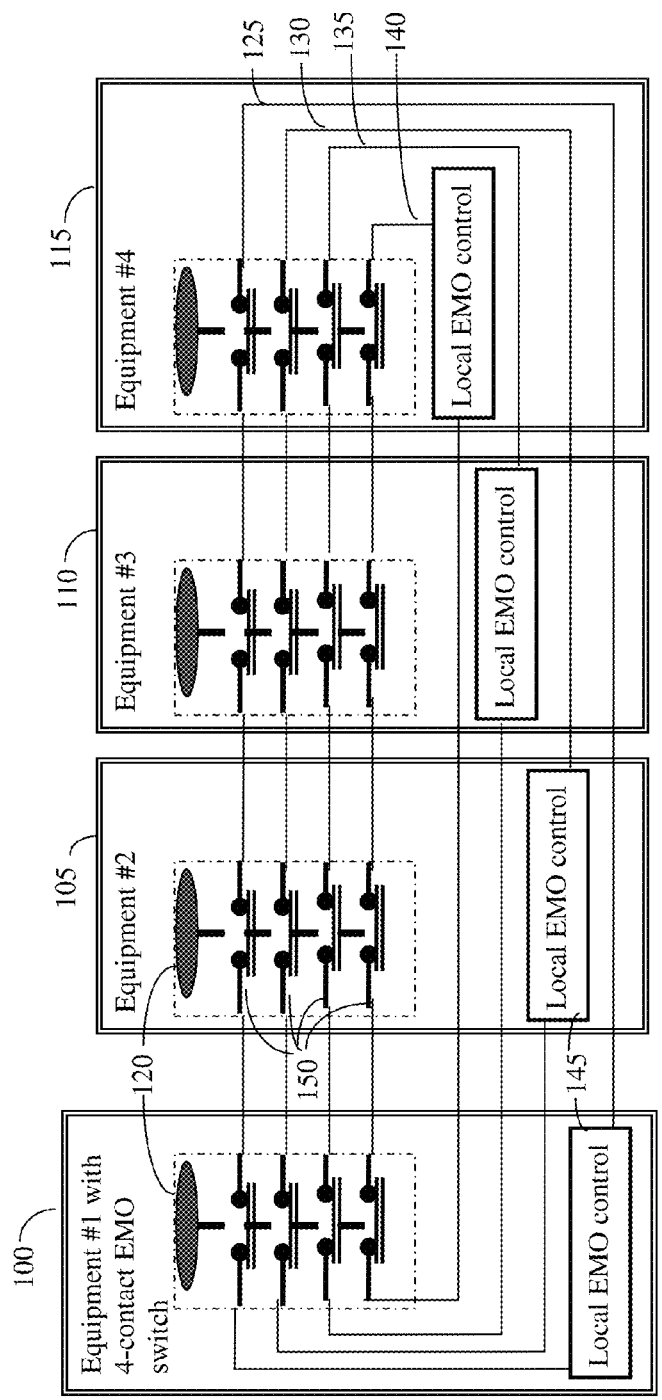
FIG. 1 illustrates a traditional EMO linkage design.
Figure 2:
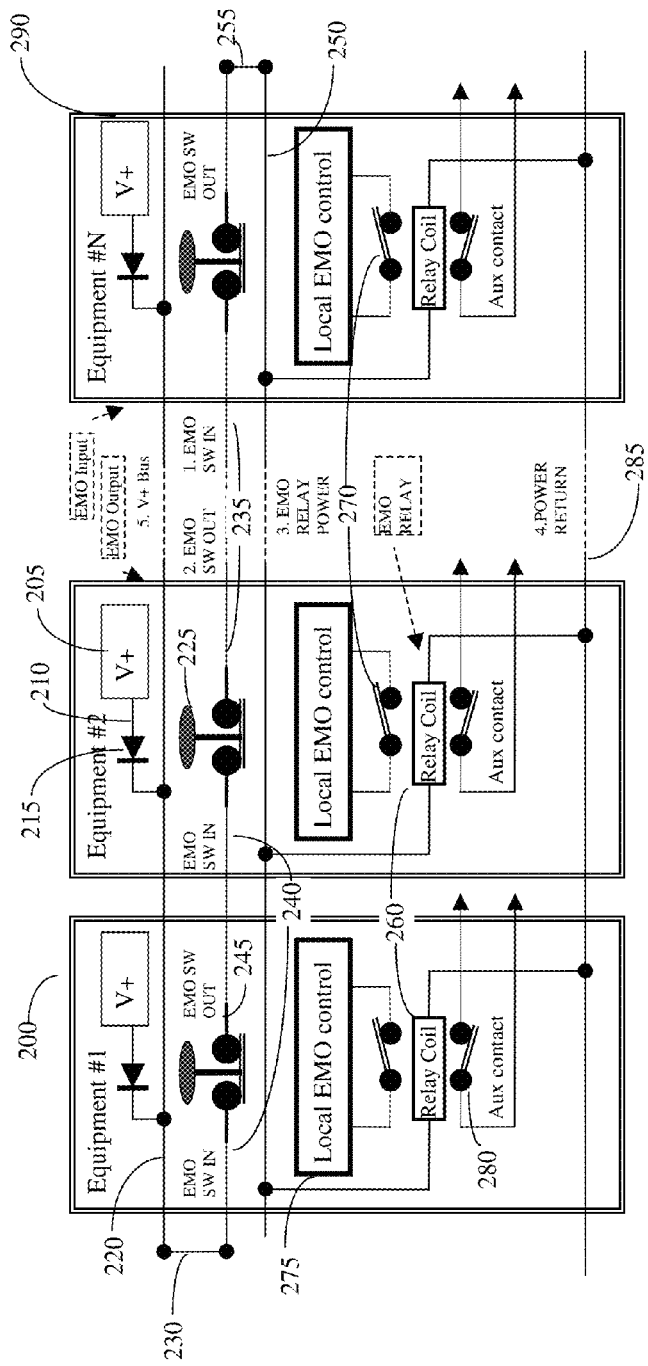
FIG. 2 illustrates an embodiment of the inventive EMO linkage design.

FIG. 2 illustrates an embodiment of an inventive simplified EMO linkage circuit design. Each piece of equipment is associated with an identical EMO module 200. The EMO modules for different equipment are daisy-chained in series into a complete circuit. Additional modules can be added very easily, as will be shown hereinafter. Power supplies 205 (e.g., +24 VDC) have their outputs 210 connected through optional diodes 215 to V+ bus 220, which is connected to the EMO switches 225 of all equipment modules. V+ bus 220 provides power to the entire series of EMO modules through series linkage of all EMO switches 225, which are connected as follows: Jumper 230 from V+ bus 220 to EMO switch series circuit 235 connects V+ bus 220 to a first contact 240 of the first EMO switch 225. This contact is termed "EMO switch in". Second contact 245 of the first EMO switch 225 is termed "EMO switch out", and is linked to EMO switch in 240 of the second EMO switch 225. The EMO switches are connected in the same way up through the last equipment, termed "Equipment N". The EMO switch out for equipment N is jumped to EMO relay power bus 250 with jumper 255. Assuming the circuit remains closed, EMO relay power bus 250 powers relay coils 260 in each module. Within each equipment module, EMO relay coil 260 is connected to EMO relay power bus 250. When the EMO circuit is closed and EMO relay power bus 250 is powered, relay coils 260 are also powered. The powered relay coils 260 close contacts 270 which are in series with local EMO control circuits 275 in each EMO module. When contacts 270 are closed, local EMO control maintains power to the local equipment. However, if any of EMO switches 225 are activated, the EMO circuit is opened, EMO relay power 250 to each relay coil 260 is lost, and contacts 270 are opened. In this case, the local EMO control circuits 275 turn off the associated equipment under EMO mode.

The serial module aspect of the inventive circuitry enables simple addition of new equipment. It may be accomplished by removing jumper 255 from Equipment N, adding an additional module 200 in series after module N, and repositioning jumper 255 after the new module. Alternatively, a new module can be inserted between two existing modules by breaking the original connections, then re-connecting to the inserted module. In either of these cases, no modification is necessary within the modules, as is necessary with the traditional circuitry.

Optional diodes 215 act as blocking diodes which prevent false EMO shutdowns if one of the power supplies 205 are off. Auxiliary contacts 280, also controlled by relay coils 260, may be used for controlling any equipment that does not have the inventive simplified EMO linkage designed in during EMO linkage integration. Power supply return bus 285 closes the circuit, i.e., is the return to all power supplies 210.

The inventive EMO linkage circuit design provides simplification of test cells comprising equipment that shares energy or power hazards. The inventive EMO design utilizing equipment modules connected in series in a daisy-chain mode enables addition or movement of equipment simply, without requiring modifications within modules. Regardless of how many pieces of equipment are linked, only five signal paths are required for the EMO linkage: 1) EMO switch in; 2) EMO switch out; 3) EMO relay power; 4) power return; and 5) V+ Bus. In addition, only one-contact EMO switches are needed, eliminating the need for costly and difficult-to-obtain multi-contact EMO switches, which would need to be modified if additional equipment were added.

It is not expected that the invention be restricted to the exact embodiments disclosed herein. Those skilled in the art will recognize that changes and modifications can be made without departing from the inventive concept. By way of example, details of the exact circuitry within each module may be different, while maintaining the serial modular aspects of the inventive design. The scope of the invention should be construed in view of the claims.

With this in mind, we claim:

1. An apparatus for implementing a unified emergency machine off (EMO) linkage circuit for multiple pieces of equipment sharing energy or power hazards, the apparatus comprising:
   a plurality of modules, each module is associated with a corresponding piece of equipment, and each module includes,
      a switch including a corresponding switch in contact and a corresponding switch out contact:
      a relay including a corresponding relay coil and a corresponding relay contact; and
      a local control;
   wherein the switch in contact of a first switch is coupled to a module power supply, the switch out contact of a last switch is coupled to a power return through the relay coil of each module, and each of the other switch out contacts are coupled to a switch in contact of a successive switch arranged in a daisy chain series circuit, and wherein each relay contact couples equipment power to each corresponding local control.

2. The apparatus of claim 1, wherein when the switches of the plurality of modules are dosed the relays of the plurality of modules are powered by the module power supply and in turn the local controls of the plurality of modules maintains equipment power to each corresponding piece of equipment.

3. The apparatus of claim 1, wherein when any switch of one or more of the plurality of modules are open module power supply to the relays of the plurality of modules is lost and in turn the local controls of the plurality of modules turn off the equipment power to each corresponding piece of equipment.

4. The apparatus of claim 1, further comprising a plurality of diodes, each diode coupled between a corresponding module power supply of each module and the switch in contact of the first switch.

5. The apparatus of claim 4, wherein the plurality of diodes prevent the module power supply to the relays of the plurality of modules from being lost if one of the corresponding module power supplies is off.

6. The apparatus of claim 1, wherein the relays of each of the modules further includes an auxiliary contact for controlling power to a corresponding additional piece of equipment.

\* \* \* \* \*